(12) United States Patent
Jackson et al.

(10) Patent No.: US 8,328,264 B2
(45) Date of Patent: Dec. 11, 2012

(54) CARGO BIN AND SIDE LINING WALLS FOR AUTOMOTIVE VEHICLE

(75) Inventors: Donald W. Jackson, West Mansfield, OH (US); Hiroaki Taniguchi, Dublin, OH (US); Paul Theodore Aebker, Dublin, OH (US); Matt Stechschulte, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 12/755,707

(22) Filed: Apr. 7, 2010

(65) Prior Publication Data
US 2011/0248521 A1   Oct. 13, 2011

(51) Int. Cl.
*B60R 7/02* (2006.01)
*B62D 43/10* (2006.01)

(52) U.S. Cl. .................. 296/37.14; 296/37.3; 296/37.16

(58) Field of Classification Search .................. 296/37.1, 296/37.8, 37.3, 37.13, 37.14, 37.16
See application file for complete search history.

(56) References Cited

U.S. PATENT DOCUMENTS

| | | | |
|---|---|---|---|
| 4,858,981 A | 8/1989 | Post | |
| 5,080,417 A * | 1/1992 | Kanai | 296/37.3 |
| 5,702,144 A * | 12/1997 | Matsuura et al. | 296/37.13 |
| 5,951,085 A * | 9/1999 | Fukatsu | 296/37.8 |
| 6,027,155 A | 2/2000 | Wisniewski et al. | |
| 6,247,741 B1 | 6/2001 | Seel et al. | |
| 6,749,241 B1 | 6/2004 | Erlandsson et al. | |
| 6,752,304 B1 * | 6/2004 | Hotary et al. | 224/544 |
| 6,863,328 B2 | 3/2005 | Kiester et al. | |
| 7,032,964 B2 | 4/2006 | Kirk | |
| 7,090,274 B1 * | 8/2006 | Khan et al. | 296/37.16 |
| 7,093,873 B2 | 8/2006 | Nilsrud et al. | |
| 7,156,439 B2 | 1/2007 | Bejin et al. | |
| 7,503,610 B2 * | 3/2009 | Karagitz et al. | 296/37.16 |
| 7,600,800 B2 | 10/2009 | Suzuki | |
| 7,628,440 B2 * | 12/2009 | Bernhardsson et al. | 296/37.14 |
| 7,631,919 B2 * | 12/2009 | Schrader | 296/37.6 |
| 7,651,148 B2 | 1/2010 | Hustyi et al. | |
| 7,661,742 B2 * | 2/2010 | Medlar et al. | 296/37.16 |
| D612,315 S | 3/2010 | Narazaki | |
| 7,794,004 B2 * | 9/2010 | Aebker et al. | 296/37.8 |
| 7,980,416 B2 * | 7/2011 | Chou | 220/815 |
| 8,128,146 B2 * | 3/2012 | Sogame et al. | 296/37.8 |
| 2008/0164709 A1 * | 7/2008 | Bernhardsson et al. | 296/37.14 |
| 2010/0078956 A1 * | 4/2010 | Aebker et al. | 296/37.13 |
| 2010/0320793 A1 * | 12/2010 | Aebker et al. | 296/37.13 |
| 2011/0248521 A1 * | 10/2011 | Jackson et al. | 296/37.1 |

* cited by examiner

*Primary Examiner* — Glenn Dayoan
*Assistant Examiner* — Gregory Blankenship
(74) *Attorney, Agent, or Firm* — Fay Sharpe LLP

(57) ABSTRACT

A cargo bin assembly of an automotive vehicle includes a recess that extends below a floor surface. The recess preferably has a stepped conformation where a first, shallow rim portion receives support members without the potential for interfering with items stored in a second, deep storage portion of the recess. Preferably, the deep storage portion is dimensioned to receive side panel lids from side storage assemblies. Removal of the generally planar side panel lids allows elongated items to be received in the cargo area, and the cargo recess allows the side panel lids to be stored. No openings are provided along the lower portion of the side storage cavity to prevent collection of dirt or debris.

17 Claims, 6 Drawing Sheets

CARGO BIN AND SIDE LINING WALLS FOR AUTOMOTIVE VEHICLE

BACKGROUND

This disclosure relates to a side storage unit(s) in an automotive vehicle cargo area such as found in a minivan, SUV, cross-over, hatchback or the like that is selectively closed by a side panel lid, and also to a cargo bin that receives the side panel lids for temporary storage. Still other aspects of the disclosure are applicable to storage of materials other than side panel lids in the cargo bin, and likewise for a preferred design for the side panel units that provide a clean, smooth appearance whether the side panel lid is installed or removed from the side storage unit.

Usually side panel lids in a cargo area in vehicles of this type are intended to cover other parts, for example, a jack, tools, hidden storage, etc. The side panel lids in the cargo area are primarily designed for aesthetic purposes and appearance in the cargo area since the lids are usually intended to be installed. However, in some instances, the lids are not quickly re-installed to cover cargo or the side storage unit and as a result the side panel lids are loose in the cargo area or sometimes removed from the vehicle. This is similar to the problem associated with a tonneau cover where an automotive vehicle owner often removes the tonneau cover in order to carry cargo that is too big with the tonneau cover in place. Since there is no provision for storing the side panel lid(s), the automotive vehicle owner typically places the lids in a garage or the side panel lids sit loosely in the vehicle.

Under-floor cargo bins are also used for item storage in a cargo area in these types of vehicles. However, prior designs have the potential to crush peripheral edges of the stored item when the cargo bin cover is closed. For example, expansible supports or expansible cylinder assemblies when extended are typically used to support the cover in an open position. When the cargo lid is closed, occasionally the cylinder assemblies in a retracted position interfere with the stored item.

Still another consideration is that side panel units are typically constructed to include holes, pins, or hinges on a lower portion of a side lining to maintain the lid in place and these structures are not aesthetically pleasing. Corresponding hardware on the side panel lid complicates potential storage of the side lids, while holes or openings in the side lining would be exposed and become potential areas that collect dirt and debris when the side panel lid is removed.

Accordingly, a need exists for an improved side panel lid, side storage unit, and an improved cargo bin that overcomes these noted problems and others in an easy-to-use, efficient, and inexpensive manner.

SUMMARY

A cargo bin for an automotive vehicle includes a floor surface in the vehicle with a recess extending below the first floor surface dimensioned to receive first and second side panel lids when the lids are removed from the associated side storage units. A cover overlies the cargo bin recess and is pivotally connected to floor surface. At least one expansible cylinder assembly supports the cover in an open position when extended and is retracted when the cover is closed in a substantially flush relation with the floor surface. The cargo bin recess preferably has a stepped conformation that includes a shallow rim, first portion that receives the expansible cylinder(s), and a deep storage, second portion for receiving stored items therein.

The deep storage portion of the cargo bin recess is dimensioned to receive the first and second side panel lids.

Each of the first and second side panel lids has a substantially planar conformation and a selectively retractable latch member that moves in a plane parallel and adjacent the side panel lid.

A side storage unit includes a side storage cavity that is selectively covered by a side panel lid having a substantially planar conformation. A selectively retractable latch is disposed adjacent an upper edge of the side panel lid and moves in a plane substantially parallel and adjacent the side panel lid for selective engagement with the side lining of the storage unit. A shoulder extends along a lower edge of the opening for abutting with a lower edge of the side panel lid, and a stopper is spaced from the shoulder and dimensioned to receive a lower edge of the side panel lid therebetween.

The stopper has a longitudinal dimension extending substantially parallel to the shoulder, and the longitudinal dimension is substantially less than a longitudinal dimension of the shoulder.

A primary advantage of the disclosure relates to a side storage unit that includes a selectively removable side panel lid for expanding storage capacity in the cargo area and presents an aesthetically pleasing appearance when the side panels are removed.

Another benefit is associated with the eliminating any openings along a side lining when the side panel lid is removed.

Still another benefit resides in the planar construction of the side panel lid that is dimensioned for receipt in a cargo bin of the vehicle.

Still another advantage is realized with a stepped configuration of the cargo bin to protect articles stored in the deep storage portion, and to prevent interference with the support cylinder assemblies of the cargo bin lid.

Still other features and benefits of the present disclosure will become apparent from reading and understanding the following detailed description.

DETAILED DESCRIPTION

Figure 1:
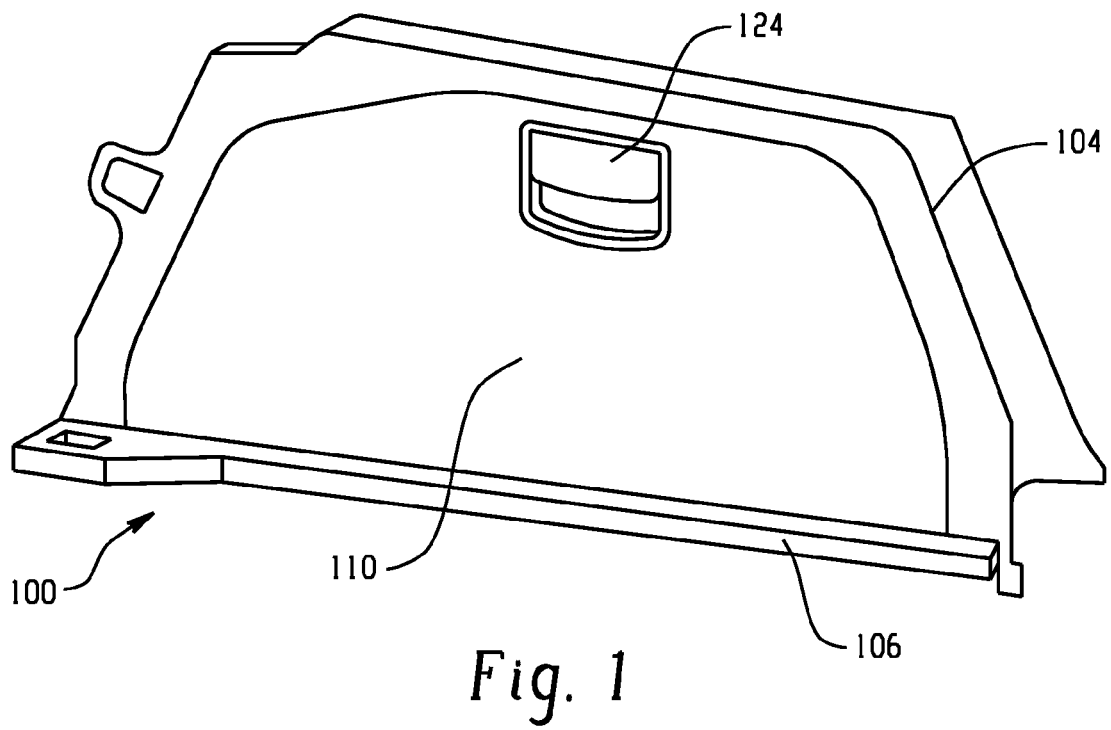
FIG. 1 is a perspective view of a side storage unit or assembly in an automotive vehicle.

Turning first to FIGS. 1-5, an automotive vehicle such as a minivan, SUV, cross-over, hatchback or the like is often provided with a cargo storage area behind a rear seat of the vehicle. The cargo area sometimes includes side storage compartments, units, or assemblies 100 typically having an irregular side lining 102 that includes a side lining upper portion 104 and side lining lower portion 106 that together with removable side panel lid 110 form a storage cavity 112. Typically, the side panel lid is mounted in place (FIG. 1, FIG. 5) and closes off the cavity 112 and provides a neat, clean aesthetic appearance.

Occasionally, however, an automotive vehicle owner requires additional storage capacity in the cargo area. For example, golf clubs or other elongated structures may require additional dimension in a side-to-side direction in order to accommodate such elongated items in the cargo area. In other instances, these side storage cavities 112 may receive tools or the like. Where the additional side-to-side dimension is required in order to store a particular item, as opposed to temporarily accessing the storage cavity to remove an item, it is desirable that the side panel lids 110 be stored safely in the vehicle.

Figure 2:
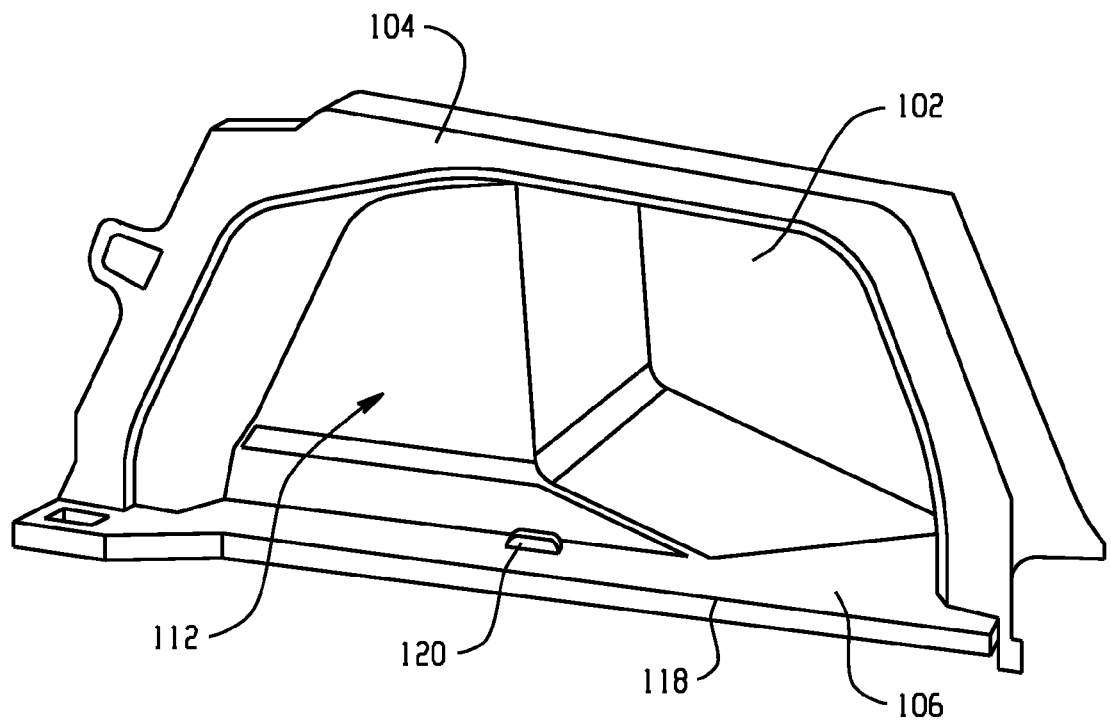
FIG. 2 is a perspective view similar to FIG. 1 with the side panel lid removed.
Figure 3:
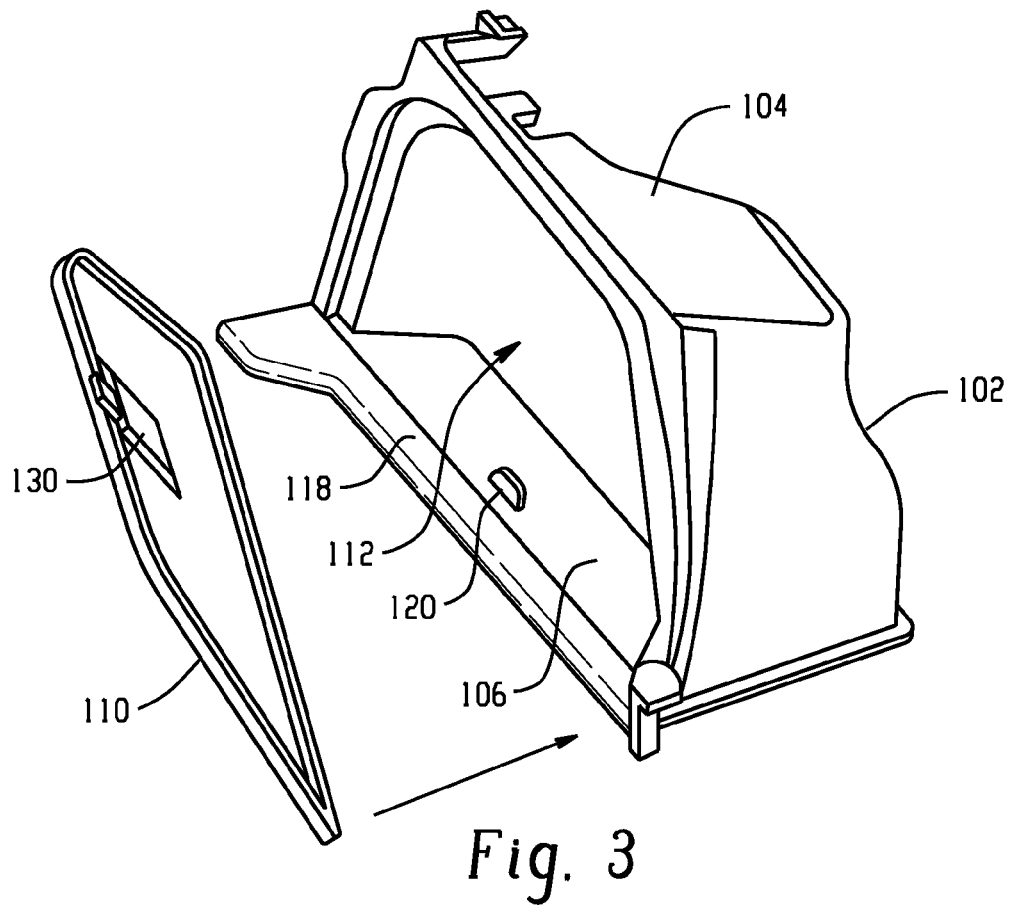
FIG. 3 is perspective view of the side panel lid removed from the side storage unit.

It is also important that the side panel lid be easily removed and retained in position over the side storage cavity, and that the open cavity and side storage unit be able to easily receive the side panel lid and, in the absence of the lid, be formed so that the side storage unit does not contribute to collection of debris or dirt in certain areas. Thus, the side panel lid 110 preferably has a panel 114 of generally planar configuration, including a first surface 114a that faces toward the side storage cavity 112 and a second surface 114b that faces away from the storage cavity. The first surface 114a, and particularly an upper edge and side edges thereof, abuttingly engage side lining upper portion 104. The second surface 114b of the side panel lid has a lower edge 116 dimensioned for receipt along a shoulder 118 formed in the side lining lower portion 106. A stopper 120 is spaced inwardly toward the cavity 112 from the shoulder 118 to support a limited interior lower edge 122 of the side panel lid. The stopper 120 has a longitudinal dimension extending substantially parallel to the shoulder 118. In the exemplary embodiment, the longitudinal dimension of the stopper 120 is substantially less than a longitudinal dimension of the shoulder 118, and the stopper is generally centered along the longitudinal dimension of the shoulder (FIG. 2).

Figure 4:
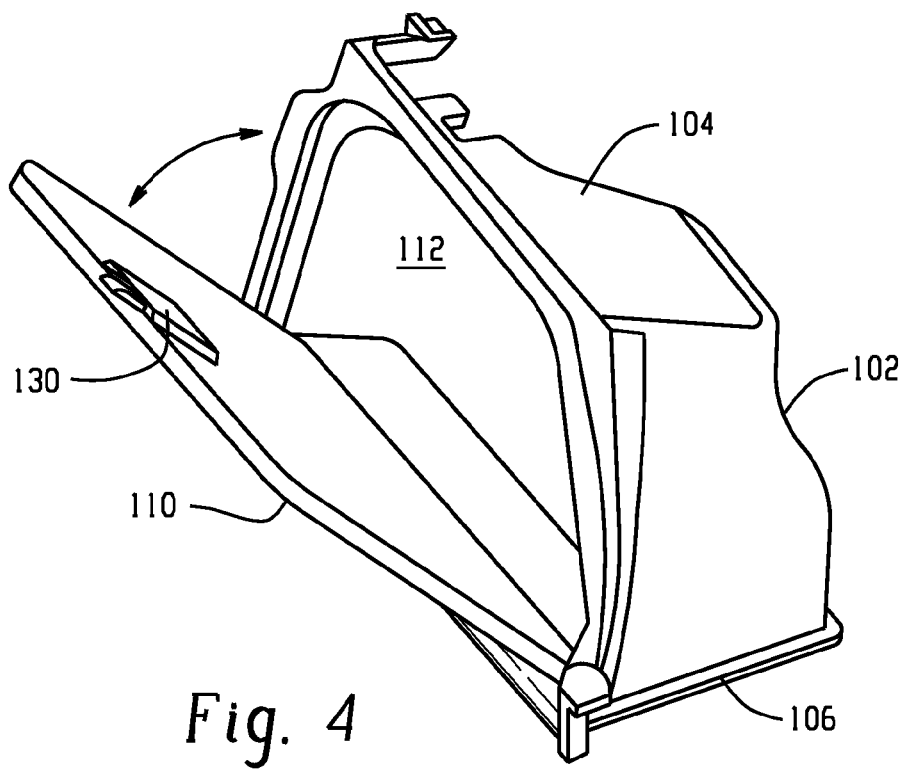
FIG. 4 shows placement of a lower edge of the side panel lid prior to tilting the lid into an installed position.
Figure 5:
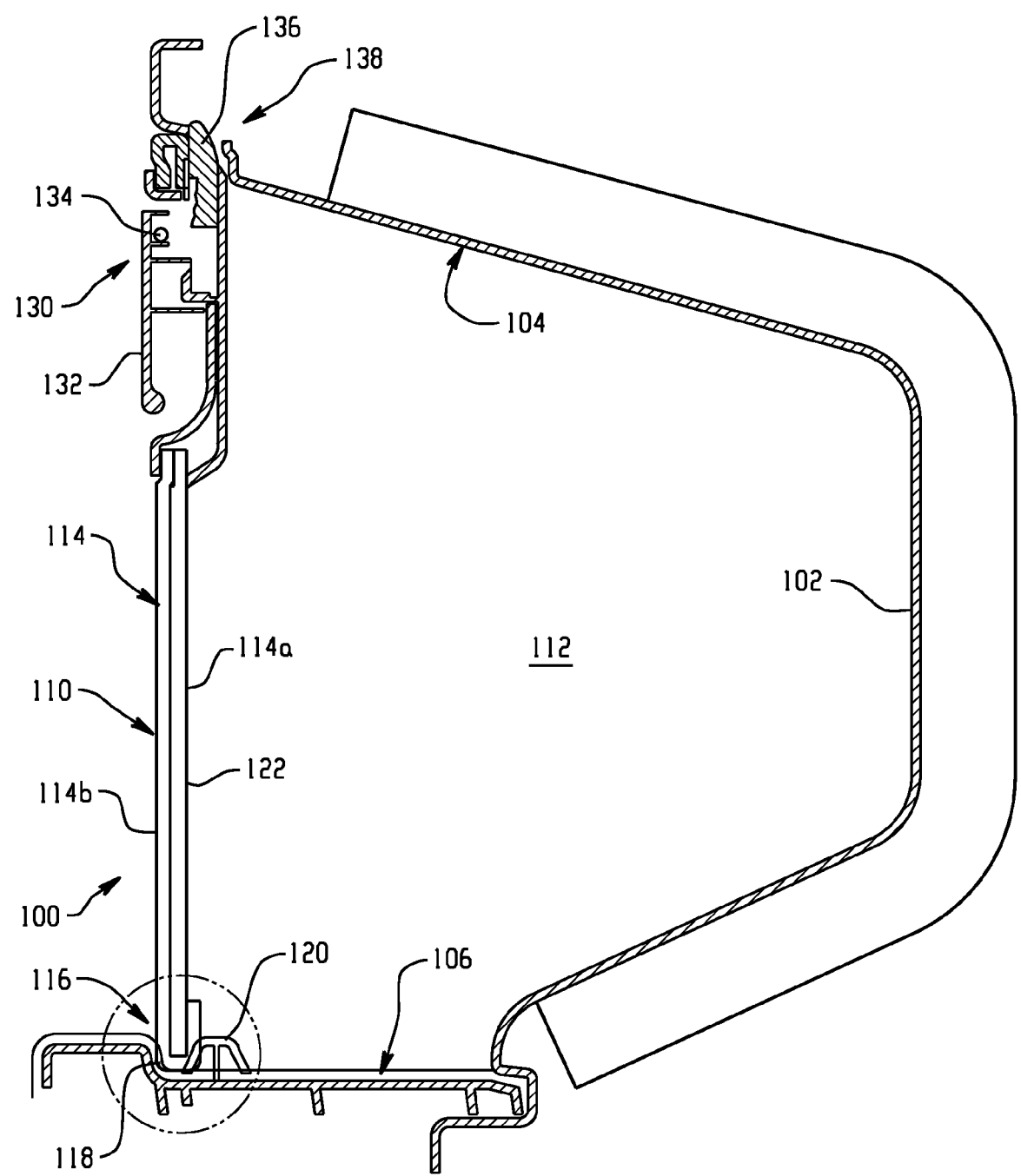
FIG. 5 is a cross sectional view of the side panel lid in an installed position enclosing the side storage cavity.
Figure 6:
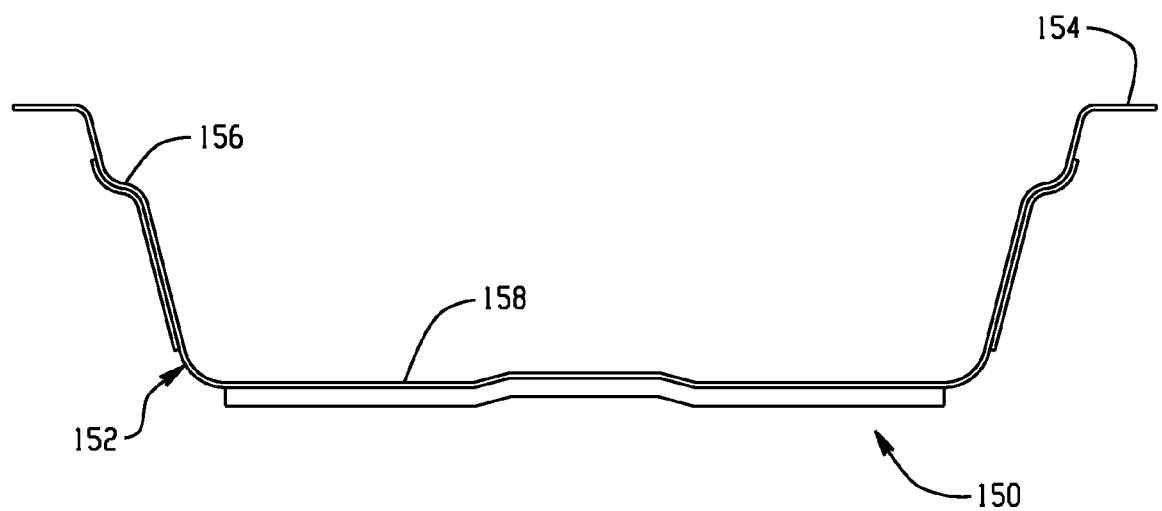
FIG. 6 is a cross sectional view of a cargo bin.

The side panel lid is provided with a handle 124 and latch assembly 130. Handle 132 is selectively pivoted about pin 134 (FIG. 5) to insert and withdraw latch member or latch 136 through an opening 138 in the side lining upper portion 104. Typically the latch 136 is spring biased toward the position shown in FIG. 5. For example, when the handle is disposed in generally planar relation with the remainder of the side panel lid, the latch 136 is urged by a spring into the opening 138 in the side lining upper. If it is desired to remove the side panel lid from the side storage unit, the handle 124 is rotated about pin 134 against the bias of the spring, and the latch 136 is retracted from the opening 138. This allows the remainder of the side panel lid 110 to be rotated about lower edge 116 and thereby pivot the lid in an opening direction, i.e., counterclockwise as shown in FIG. 4. Ultimately, the side panel lid 110 is then removed from the remainder of the side storage unit (FIG. 3) to allow full access to the inner cavity 112. Notably, the shoulder 118, and stopper 120 a spaced apart by a preselected dimension to form a gap that receives lower end 116 on the side panel lid. No holes or openings are required in the side lining lower portion 106 to accommodate receipt of the side panel lid. Likewise, this means that debris and dirt is less likely to collect in this region of the side storage cavity, and a neat, clean appearance is presented when the side panel lid is removed from side storage unit.

As noted above, if a particular item to be placed In the cargo area of the vehicle has an extended length and requires the additional side-to-side dimension offered by removal of the side panel lid(s), the vehicle owner will find it necessary to store the lid(s) in a convenient manner. As shown in FIGS. 6-11, a cargo bin assembly 150 is provided in the cargo area of the vehicle. The cargo bin 150 includes a recess 152 that extends below a floor surface 154. The recess 152 is dimensioned to receive the first and second side panel lids 110 when the lids are removed from the side storage assembly. More particularly, the recess 152 has a generally stepped conformation formed by a first or shallow rim portion 156 and a second or deep storage portion 158. The deep storage portion 158 is preferably dimensioned to receive each of the side lids 110 in generally planar, stacked relation. More particularly, the side-to-side and front-to-rear dimensions of the deep storage portion 158 are sized to accommodate the entire perimeter of each side panel lid. Moreover, the depth of the second storage portion 158 is sufficient to allow the side panel lids to be stacked one on top of the other without extending to or above the shallow rim portion 156.

Figure 7:
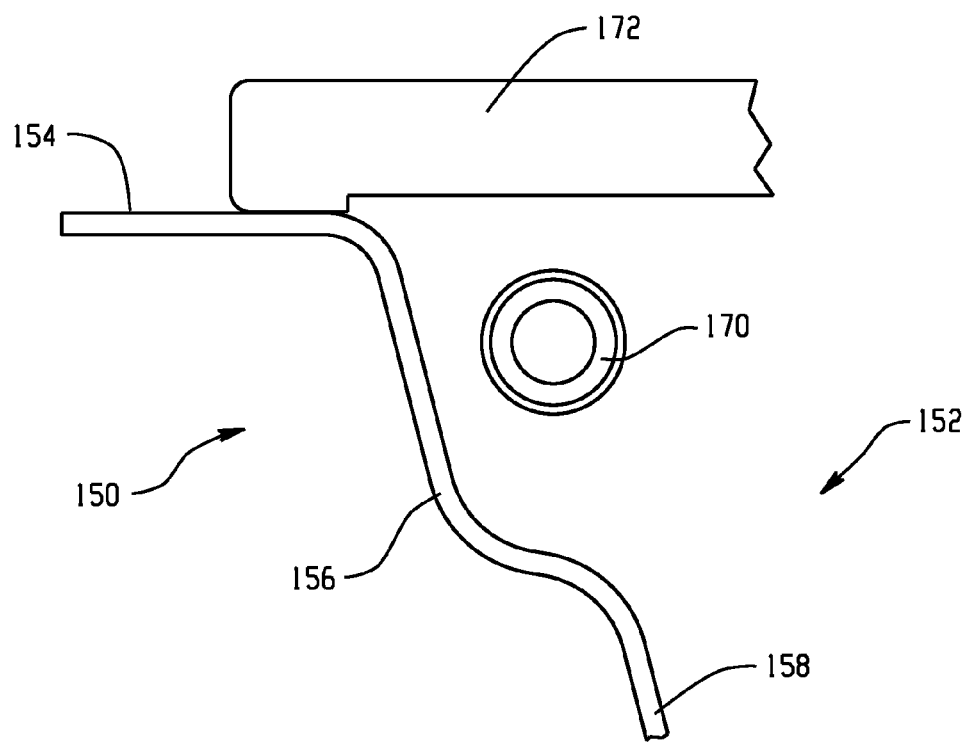
FIG. 7 is an enlarged view of the encircled portion of the cargo bin of FIG. 6.
Figure 8:
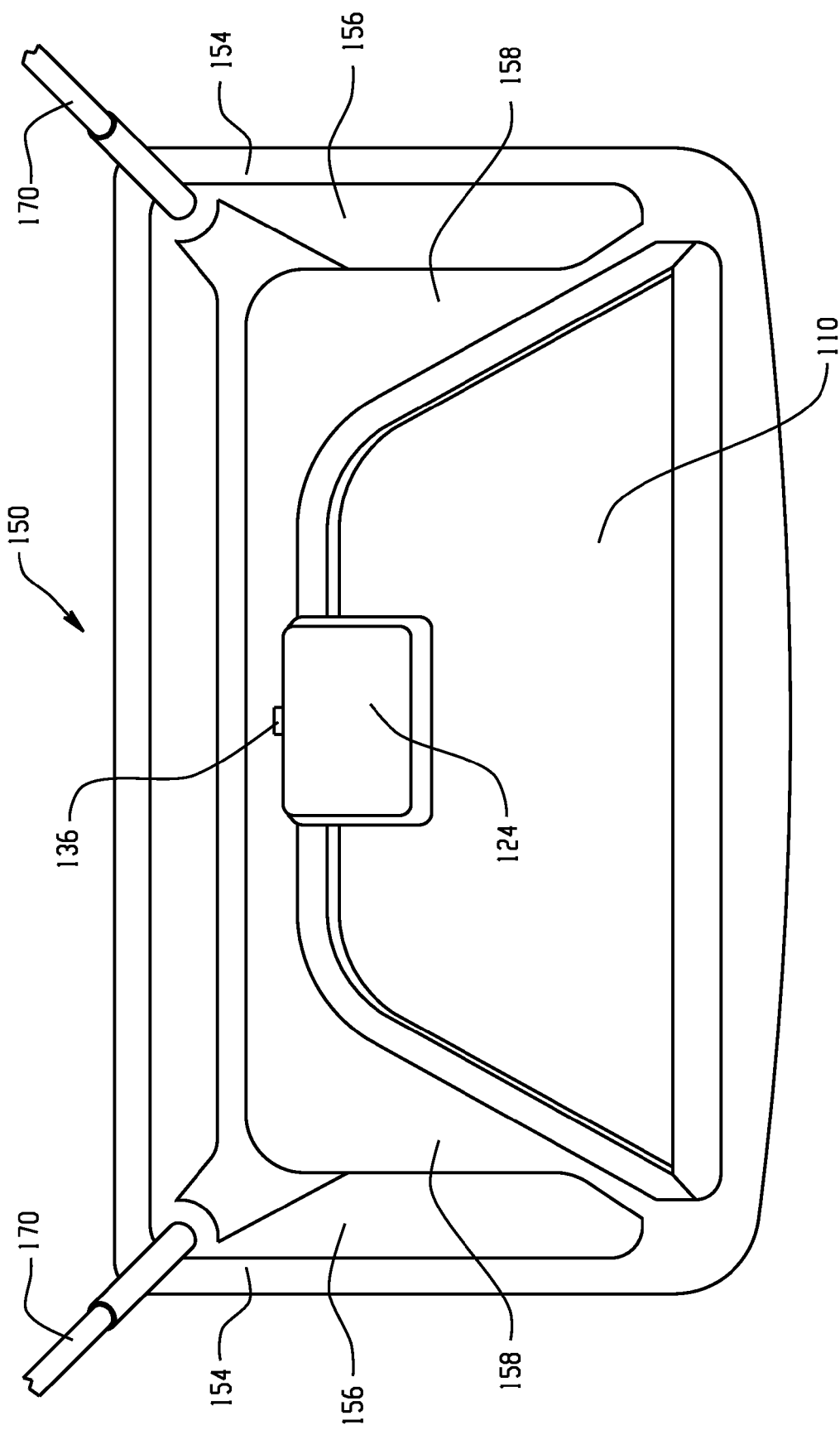
FIG. 8 is a plan view of the cargo bin with expansible supports holding a cargo cover in an open position and side panel lids stored inside the cargo bin.
Figure 9:
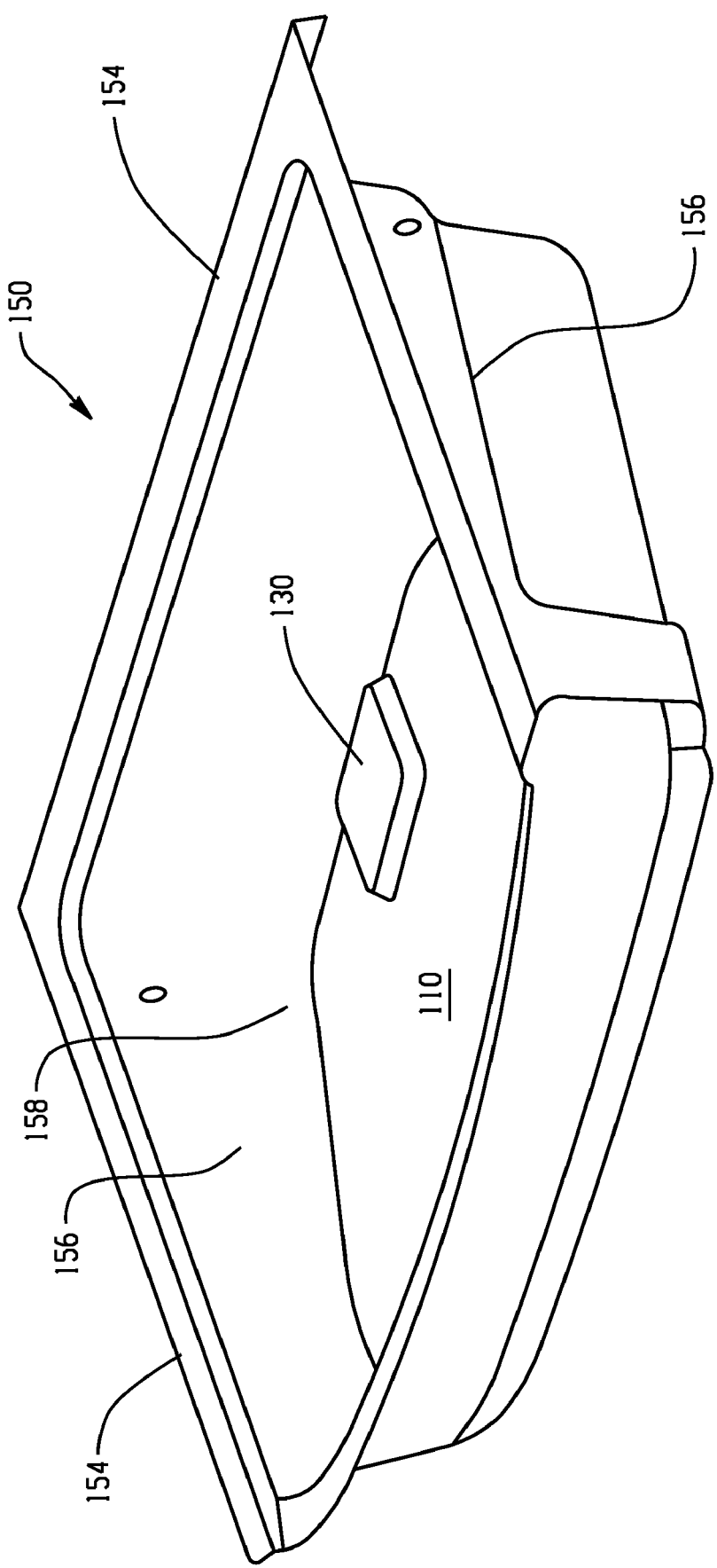
FIG. 9 is a perspective view of the cargo bin with the side panel lids stored therein.

As is more particularly shown in FIGS. 7 and 8, first and second extendible support members, which are preferably expansible cylinder assemblies 170, have a first end pivotally mounted in the recess 152, and are dimensioned for receipt in the shallow rim portion 156. A second end of each support member 170 pivotally engages a cargo cover 172 in a closed position of the cover over the recess, each of the support members 170 are received in the shallow rim portion 156 of the cargo recess (FIG. 7). The stepped conformation between the shallow rim portion 156 and the deep storage portion 158 is designed to prevent vehicle owners from storing items in the recess along the shallow rim portion 156 where such items would potentially be at risk of being crushed by the cargo cover 172 or the support members 170. Instead, the deep recess portion 158 and the stepped conformation is shaped to prevent any inadvertent engagement between the cargo cover, the stored item(s), and the support members. Designing the cargo recess in this manner prevents the vehicle owner from inadvertently loading items under the open support members. The deep recess portion also prevents any stored items in the cargo recess from inadvertently sliding under the open support members 170 where there would be a potential for damage.

The generally planar conformation of the side lids allows each of the lids to be received in the cargo recess, and particularly in the deep storage portion thereof. Since there are no hinges or components that extend outwardly from the generally planar shape, other items that may be stored in the cargo recess are likewise unlikely to be damaged.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:
1. A cargo bin in an automotive vehicle comprising:
a floor surface in the vehicle;
a recess extending below the floor surface dimensioned to receive at least one of first and second side panel lids upon detachment from a respective side panel;
a cover overlying the recess and pivotally connected to the floor surface for providing selective access to the recess;
at least one expansible support member for selectively supporting the cover in an open position when extended and positioning the cover in substantially flush relation with the floor surface in a closed position; and the recess having a stepped conformation, a shallow rim portion received adjacent the expansible support member, and a deep storage second portion dimensioned to receive first and second side panel lids wherein each of the first and second side panel lids has a connection member disposed in substantially coplanar relation with a remainder of the side panel lid.

2. The cargo bin of claim 1 wherein each of the side panel lids includes a planar flange extending from a perimeter edge.

3. The cargo bin of claim 1 wherein each of the side panel lids has a selectively retractable latch that moves in a plane parallel and adjacent the side panel lid.

4. The cargo bin of claim 3 wherein each of the side panel lids includes a biasing member for urging the retractable latch into a latched position.

5. The cargo bin of claim 1 wherein each side panel lid is substantially planar and the deep storage portion of the recess has a height dimension for accommodating the side panel lids in stacked relation.

6. The cargo bin of claim 1 wherein the shallow rim portion extends along opposite peripheral portions of the recess.

7. The cargo bin of claim 1 wherein each of the first and second side panel lids has a substantially planar conformation dimensioned for covering receipt over an opening in a side lining substantially encompassing side storage cavity of a respective side storage unit;
a selectively retractable latch disposed adjacent an upper edge of the first side panel lid that moves in a plane substantially parallel and adjacent the side panel lid for selective engagement with the side lining;
a shoulder extending along a lower edge of the opening for abutting along a lower edge of the side panel lid; and
a stopper spaced from the shoulder and dimensioned to receive a lower edge of the side panel lid therebetween.

8. The side storage unit of claim 7 wherein the latch and a handle operatively associated with the latch are biased toward a substantially planar closed position.

9. The side storage unit of claim 7 wherein the stopper is spaced from the shoulder by a dimension substantially identical to a thickness of the side panel lid.

10. The side storage unit of claim 9 wherein the stopper has a longitudinal dimension extending substantially parallel to the shoulder, the longitudinal dimension being substantially less than a longitudinal dimension of the shoulder.

11. The side storage unit of claim 10 wherein the stopper is generally centered along the longitudinal dimension of the shoulder.

12. The side storage unit of claim 7 wherein the side panel lid has a first surface facing toward the cavity and a second surface facing away from the cavity, the first surface engaging a side lining along a major portion, and the second surface engaging a side lining along a minor portion thereof.

13. A cargo bin in an automotive vehicle comprising:
a floor surface in the vehicle;
a recess extending below the floor surface dimensioned to receive at least one of first and second side panel lids upon detachment from a respective side panel;
a cover overlying the recess and pivotally connected to the floor surface for providing selective access to the recess;
at least one expansible support member for selectively supporting the cover in an open position when extended and positioning the cover in substantially flush relation with the floor surface in a closed position; and
the recess having a stepped conformation, a shallow rim portion received adjacent the expansible support member, and a deep storage second portion wherein each side panel has a back sidewall and a front sidewall that respectively abut with rear surface and front surface regions of the side panel lid, respectively.

14. The cargo bin of claim 13 wherein the back sidewall extends along approximately three-fourths of a perimeter of the side panel lid.

15. The cargo bin of claim 14 wherein the front sidewall extends along approximately one-fourth of the perimeter of the side panel lid.

16. A combination of a side storage unit and a cargo bin in a cargo area of an automotive vehicle comprising:
a cargo bin provided in a floor surface in the vehicle having a recess extending below the floor surface, a cover overlying the recess and pivotally connected to the floor surface for providing selective access to the recess, and the recess having a stepped conformation that includes a shallow rim portion received adjacent the expansible support member and a deep storage second portion; and
a side storage unit having a removable a side panel lid detachably engaged therewith wherein the deep storage portion is dimensioned to receive the side panel lid therein, and wherein the side storage unit includes a shoulder extending along a lower edge for abutting with a lower edge of the side panel lid and a stopper spaced from the shoulder and dimensioned to receive a lower edge of the side panel lid therebetween.

17. A combination of a side storage unit and a cargo bin in a cargo area of an automotive vehicle comprising:
a cargo bin provided in a floor surface in the vehicle having a recess extending below the floor surface, a cover overlying the recess and pivotally connected to the floor surface for providing selective access to the recess, and the recess having a stepped conformation that includes a shallow rim portion received adjacent the expansible support member and a deep storage second portion;
a side storage unit having a removable a side panel lid detachably engaged therewith wherein the deep storage portion is dimensioned to receive the side panel lid therein; and
at least one expansible support member received in the shallow rim portion for selectively supporting the cover in an open position when extended and positioning the cover in substantially flush relation with the floor surface in a closed position.

* * * * *